United States Patent [19]

Barbu et al.

[11] Patent Number: 4,695,839
[45] Date of Patent: Sep. 22, 1987

[54] SLAVE-TYPE INTERFACE CIRCUIT OPERATING WITH A SERIES BUS

[75] Inventors: Stefan Barbu, Caen, France; Léonardus Valkestijn; Franciscus A. M. van de Kerkhof, both of Ba Eindhoven, Netherlands

[73] Assignee: U.S. Philips Corporation, New York, N.Y.

[21] Appl. No.: 741,090

[22] Filed: Jun. 4, 1985

[30] Foreign Application Priority Data

Jun. 8, 1984 [FR] France ............................ 84 09064

[51] Int. Cl.$^4$ ............................................. H04Q 1/00
[52] U.S. Cl. ............................ 340/825.06; 340/825.07; 364/200
[58] Field of Search .................... 365/233, 240, 241; 364/200, 382, 387, 601; 370/85, 99, 100; 340/825.04, 825.06, 825.07, 825.15; 375/117

[56] References Cited

U.S. PATENT DOCUMENTS

| | | | |
|---|---|---|---|
| 3,634,826 | 1/1972 | Biedermann et al. | 370/100 |
| 3,963,869 | 6/1976 | Caldwell | 370/100 |
| 4,347,603 | 8/1982 | Jacob et al. | 370/85 |
| 4,394,757 | 7/1983 | Muzumdar et al. | 370/100 |

FOREIGN PATENT DOCUMENTS 0037107  10/1981  European Pat. Off. ............ 370/100

Primary Examiner—Ulysses Weldon
Attorney, Agent, or Firm—Thomas A. Briody; William J. Streeter; Gregory P. Gadson

[57] ABSTRACT

A slave-type interface circuit operating with a series bus in a configuration in which writing takes place after recognition of an address. A cycle transmitted by the bus contains an address sequence and a data sequence.

The circuit controls a plurality of user circuits (COM) on the basis of data stored in a memory (M) and of a decoder (CDEC).

A register (REG) and a bus logic (BUSL) receive at their inputs ($L_1$, $L_2$) information (SDA) and clock (SCL) signals. The bus logic (BUSL) receives from an identification circuit (AIC) a signal (DVA) indicating whether or not the address transmitted by the bus corresponds to an address $A_0$, $A_1$, $A_2$ displayed at the inputs $S_0$, $S_1$ and $S_2$. It controls the circuit on the basis of the register (REG) initialization signal (RST1), a signal LDS) for the authorization of the loading of data into the memory (M) and an acceptance signal (ACK) transmitted in the direction of the bus.

15 Claims, 5 Drawing Figures

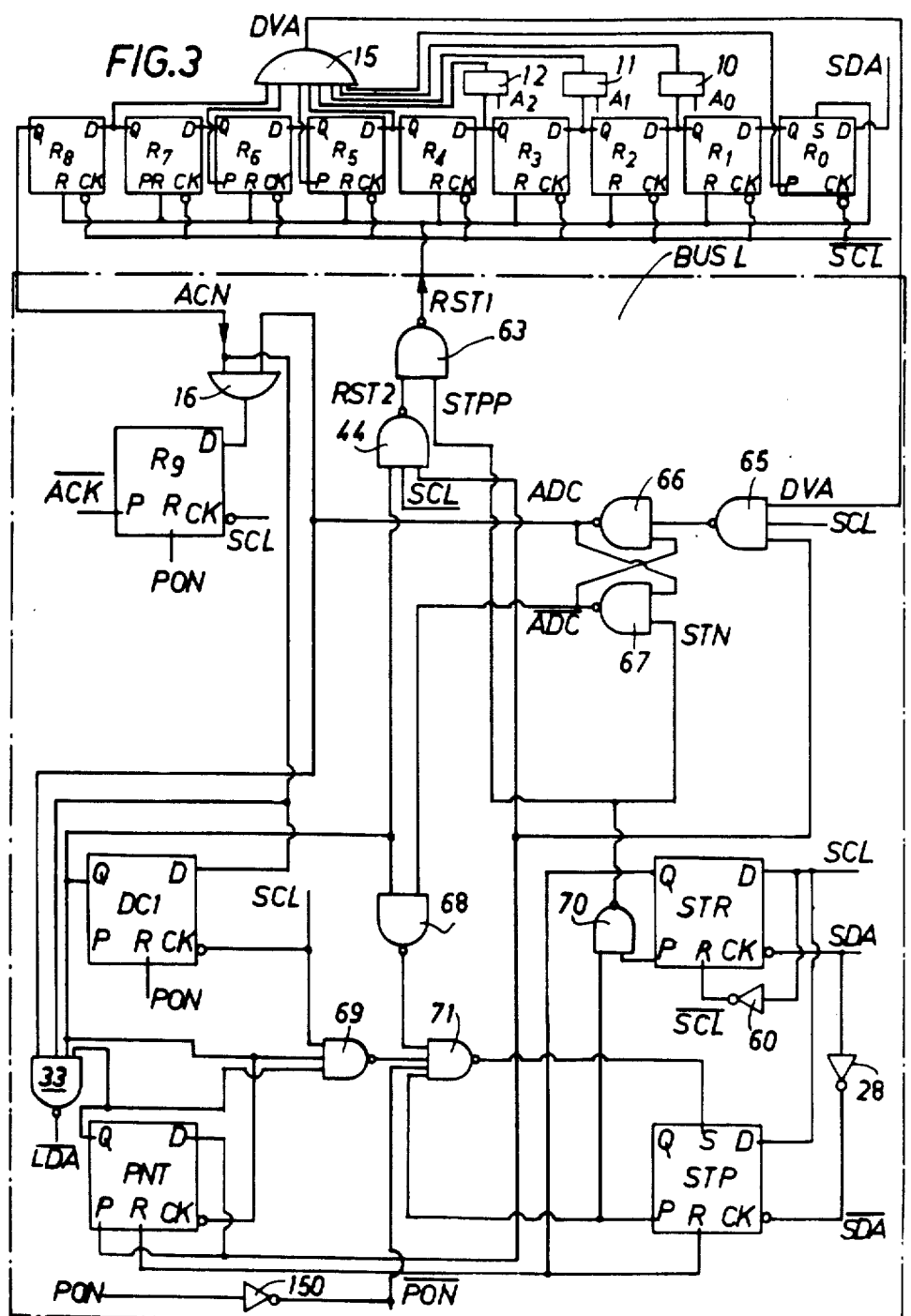

SLAVE-TYPE INTERFACE CIRCUIT OPERATING WITH A SERIES BUS

BACKGROUND OF THE INVENTION AND EXEMPLARY PRIOR ART

The invention relates to a slave-type interface circuit intended for controlling of a plurality of user circuits or channels and comprising logic inputs for receiving data and clock signals provided by a series bus, a register for receiving the signals received from the bus at the logic inputs and a memory for storing the data received by the register.

A circuit of this kind is known from the U.S. patent application Ser. No. 317,693, filed Nov. 2, 1981, in the form of a station addressable notably as a master or as a slave, and employed in a two-wire, series-type bus system.

In certain uses, for example in television apparatus, one or more interface circuits are generally used between the receiver and a television-equipment connector. The conventional circuits for this application cannot be controlled from a bus.

NON-LIMITING STATEMENT OF THE INVENTION'S OBJECT

The invention is intended to provide an interface circuit which can be controlled from a series bus, and is designed to act only as a slave-type interface in a configuration in which writing into the memory takes place after recognition of an address.

SUMMARY OF THE INVENTION

The object of the invention is realized by a slave type interface circuit for attaching to a serial bus having a data signal line and a clock signal line, said circuit comprising:

- a plurality of addressing inputs for receiving preset address bits for identifying the circuit in question;
- a data input connectable to said data signal line;
- a clock input connectable to said clock signal line;
- a shift register connected to said data input and clock input for receiving data sequences and address sequences under synchronization by said clock signal line, said sequences being organized in bit cycles, each bit cycle having at least one sequence;
- a memory fed by parallel outputs of said shift register;
- a first decoder fed by parallel outputs of said memory for generating decoded binary control signals for controlling user circuits;
- wherein said shift register has a downstream end output for forwarding an end-of-sequence acceptance signal to a data input of a first control flip-flop clocked by said clock signal and whose output synchronizes a second control or pointer flip-flop, whose inverted output is retrocoupled to its input, in which the presence of a logic level "1" at the output of the first flip-flop and at the output of the pointer flip-flop enables an initialization of the shift register, which corresponds to the return to a predetermined initial state;

wherein said circuit furthermore comprises:
- a logic comparator for comparing predetermined address bits in an address sequence with said preset address bits and upon correspondence producing an identification logic signal;
- a storage circuit for storing said identification signal, in the form of a stored identification signal;
- and an AND gate enabling the loading into the memory of the data from the shift register when both the outputs of the first control flip-flop and of the pointer flip-flop are in the logic state "1" and when also said stored identification signal is present as well as said end-of-sequence acceptance signal, whereby is signalled the end of a data sequence following said address sequence.

FURTHER SELECTED ASPECTS AND EMBODIMENTS OF THE INVENTION

In one embodiment the shift register is initialized between the address sequence and the data sequence by effecting a setting to the "1" state of the first flip-flop of a register and a resetting to zero of its other flip-flops when the output of the first control flip-flop is in the "1" state and the output of the pointer in the "0" state.

The circuit may be rendered inactive by means of a second series of logic gates inhibiting the transmission of the logic signals available at the output of the first decoder to the channels to be switched, in the presence of a logic signal called the interface-circuit "off" signal.

Validation of this "off" signal can be obtained with the aid of an authorization gate receiving at one input said "off" signal and at the other an output from a first flip-flop of the memory loaded at the time of the said loading by the first flip-flop of the shift register.

This circuit can be initialized by means of a pulse generator which, when the circuit is made live, produces a pulse causing the initialization of the memory and of the shift register.

In a variant, the bus provides, in accordance with the cited U.S. patent application, Ser. No. 317,693 starting and stopping information for a cycle of information by means of logic relations between the information signal and clock signal.

The circuit then incorporates a third and a fourth control flip-flop which, when the interface circuit is in its first state, receive the clock signal at their input and are synchronized one by the information signal and the other by the inverse thereof so that the output of the third flip-flop is changed to the state "1" by a first type of coincidence between the clock and information signals corresponding to the start of a cycle, and the fourth flip-flop is changed to the "1" state by a second type of coincidence between the clock and information signals corresponding to the end of a cycle, the third flip-flop being reset to zero by the inverse of the clock signal and the fourth flip-flop by the output from the third, the output of the fourth flip-flop being designed so as to produce, when in its logic "1" state, an initialization of the shift register by changing its first flip-flop to the "1" state and resetting its other flip-flop to zero.

The fourth flip-flop can with advantage be changed to the logic "1" state when, after an address sequence, no identification has been stored. To do so, the circuit is arranged so that the fourth flip-flop has its output changed to the logic "1" state when the stored identification signal is in the logic "0" state and when the first flip-flop has its output in the logic "1" state, this consequently producing initialization of the shift register.

The fourth flip-flop can likewise have its output changed to the logic "1" state in various configurations, particularly in the presence of a pulse produced by the pulse generator or when the outputs of the first and second flip-flops and the clock signal are together at the logic "1" level (detection of end of cycle).

The shift register may be initialized when the fourth flip-flop and, if necessary, the third flip-flop, has its output at state "1". This initialization occurs when the fourth flip-flop detects that the circuit is in the inactive state or when the third flip-flop indicates, in the course of a cycle, the untimely reception of a coincidence corresponding to the start of a cycle.

For the purpose of accepting of a data sequence following an address sequence, the circuit will with advantage incorporate an acceptance flip-flop synchronized by the clock signal and receiving at its input the logic product of the acceptance signal and the stored identification signal, and producing an authorization signal at its output towards the bus. This acceptance flip-flop may also reset the first control flip-flop to zero and change the fourth control flip-flop to the "1" state.

In one embodiment the circuit for storing the identification signal incorporates two inverting AND gates, the output of one of which is retrocoupled to one of the inputs of the other and vice versa, the other input of the first of the two inverting AND gates receiving the inverse of the identification signal, but only if the pointer has its output at the logic state "0" and if the clock signal is in the logic state "1", the other input of the second of the two inverting AND gates receiving the logic product of the inverses of the outputs of the third and of the fourth flip-flop so as to permit storage of the identification signal during each cycle.

BRIEF DESCRIPTION OF THE FIGURES

The invention will be more readily understood if the description which follows, and which is given by way of non-exhaustive example, is read in conjunction with the figures which represent:

FIG. 3 is an embodiment of the bus logic, of the register and of the address-identification circuit in FIG. 1;

DESCRIPTION OF A PREFERRED EMBODIMENT

Figure 1:
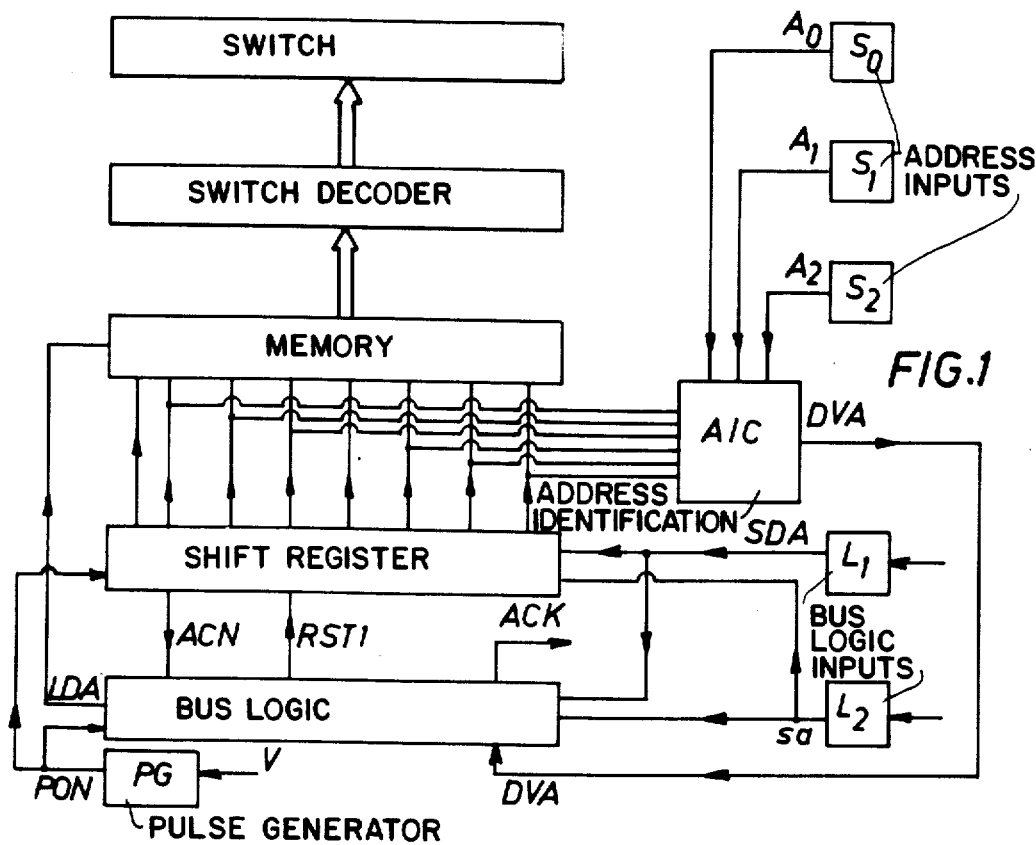
FIG. 1 is an overall diagram of a circuit according to the invention.

As shown in FIG. 1, the interface circuit comprises addressing inputs $S_0$, $S_1$, $S_2$ each capable of being connected by wiring, either to a given potential, e.g. the power-supply voltage of the circuit, or to ground so as to generate an address $A_0$, $A_1$ and $A_2$ each bit of which is coded either "0" or "1". Such an address may also be generated from a multistate logic circuit and a decoder.

An address-sequence identification circuit AIC receives signals leaving the shift register REG and also the signals $A_0$, $A_1$ and $A_2$ corresponding to the displayed address. It performs a logic comparison between all these signals in order, on the one hand, to identify whether the displayed address $A_0$, $A_1$, $A_2$ corresponds to the address transmitted by the bus and, on the other, to recognize a flag, having a fixed value, transmitted in the address sequence of a cycle, the purpose of this being to detect possible errors in the transmission of the signals. The address/sequence identification circuit produces at its output an identification logic signal DVA which is received by the bus logic BUSL.

The bus logic BUSL also receives the logic information signal SDA and the clock signal SCL, in order to recognize the start and end of each cycle. It further receives an end-of-sequence acceptance signal ACN which is produced by the register REG when all the bits forming a sequence have been received by the register REG. An information cycle transmitted by the bus is typically made up of an address sequence followed by a data sequence.

The bus logic BUSL then controls the circuit on the basis of three logic signals:

(a) a zero-resetting signal RST1 to the shift register REG which is produced at the start of each sequence and also in the case that the address is not recognized or in the event of the absence of an address;

(b) an authorization signal ACK transmitted to the bus (input $L_1$) confirming the acceptance of a sequence by the bus logic of an authorizing the transmission of the next sequence by the bus;

(c) a signal LDA controlling the data from register REG to be loaded into the memory M. Memory M controls a series of switches COM via a switching decoder CDEC.

When the interface circuit is connected to the power source, the power-supply voltage V can with advantage be applied to a pulse generator PG, which produces a pulse PON for initialization of the bus logic BUSL, of the register REG, and also of the memory M. In the rest of the description all the D-type flip-flops have been chosen of the type loading on a negative-going edge applied to their timing input CK. It will be obvious that flip-flops loading on a positive-going edge could also have been used.

THE MEMORY AND ITS CONTROL

Figure 2:
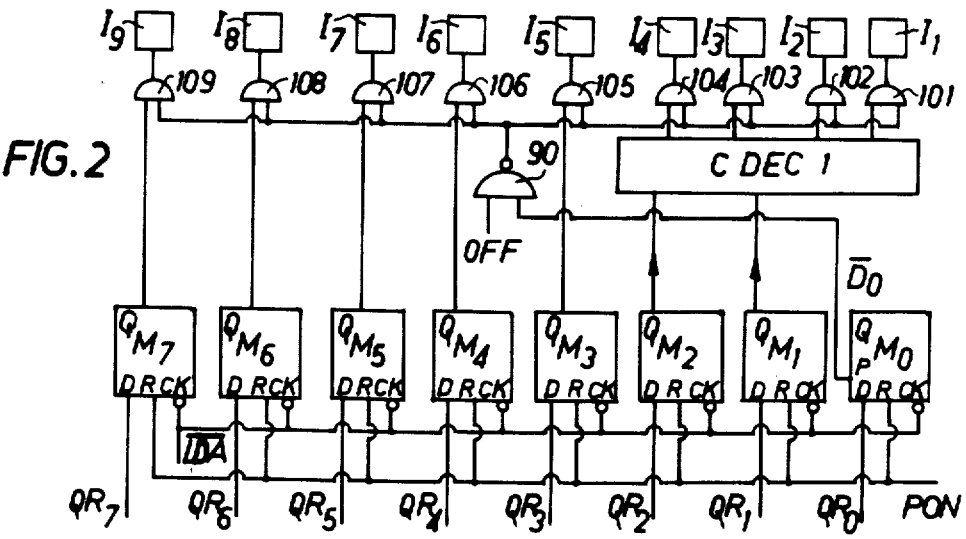
FIG. 2 is an embodiment of the memory in FIG. 1 and its functional connection with controlled switches.

As FIG. 2 shows, the memory M comprises eight D-type flip-flops $M_0$ to $M_7$, and the switching decoder CDEC is made up of a decoder CDEC 1 processing the information from memory bits $M_1$ and $M_2$ and a direct control for the other memory bits $M_3$ to $M_7$. The switching block COM here consists of nine controlled switches $I_1$ to $I_9$.

More specifically, each of the flip-flops $M_0$ to $M_7$ receives at its input D an output, respectively $QR_0$ to $QR_7$, of the register REG, the latter being formed, for example, as will be seen in FIG. 3, by a shift register comprising flip-flops $R_0$ to $R_7$ receiving the logic information SDA in series. Each of the flip-flops $M_0$ to $M_7$ receives at its timing input CK the inverse signal $\overline{LDA}$ for loading the data into the memory. When LDA changes to state "1" authorizing the loading, $\overline{LDA}$ changes to zero, producing a negative-going edge which renders the input CK of the flip-flops $M_0$ to $M_7$ active. Additionally, the flip-flops $M_0$ to $M_7$ receive at their reset-to-zero input R a pulse PON produced when the circuit is connected to the power source.

The nine controlled switches $I_1$ to $I_9$ receive the output from nine AND gates 101 to 109, one input of which receives the output from an inverting AND gate 90. The other input of AND gates 101 to 104 receives an output from the decoder CDEC 1, and that of the AND gates 105 to 109 the outputs of, respectively, $M_3$ (Q) to $M_7$ (Q) from the memory flip-flops $M_3$ to $M_7$.

When the output of the inverting AND gate 90 is in the state "1" (normal case, OFF=0), gates 101 to 109 enable the control of the switches $I_1$ to $I_9$ by the data stored in $M_1$ to $M_7$, the logic signals $QM_1$ and $QM_2$ at the output of the memory flip-flops $M_1$ and $M_2$ applied to the inputs of the decoder CDEC 1 controlling the switches $I_1$ to $I_4$, in accordance with four possible configurations, e.g. the closing of one of them at a time.

As will be explained in the course of the description, flip-flop $M_0$ is reserved for the storage of a state for enabling an "OFF" command. The inverted output $M_0(P)$ from memory $M_0$ is applied to an input of the inverting AND gate 90 whose other input receives the said command OFF from a source not shown. The inverted output $PM_0$ from the memory flip-flop $M_0$ enables, when it is at the level "1", the transmission of the "off" command OFF via gate 90. The output of gates 101 to 109 is then at "0" and deactivates switches $I_1$ to $I_9$.

DESCRIPTION OF FURTHER SUBSYSTEMS

As FIG. 3 shows, the register REG is a shift register consisting of nine D/type flip-flops $R_0$ to $R_8$. The output Q from register bits $R_0$ to $R_7$ is connected to the input D of the next register bit. Each of the flip-flops $R_0$ to $R_8$ is synchronized at its input CK by the inverse value $\overline{SCL}$ of the clock signal SCL so as to operate on the positive-going edges of the clock signal SCL. Flip-flop $R_0$ is changed to the state "1" (input 5) and the flip-flops $R_1$ to $R_8$ are reset to zero by an initialization signal RST1 available at the output of an inverting AND gate 63. Before each cycle, signal RST1 effects an initialization, with the result that $R_0(Q)=1$. This corresponds time-wise to the starting bit STA of a cycle shown in FIG. 4a. The shift register synchronized by $\overline{SCL}$ receives all the bits in the address sequence A. The correct positioning of this sequence in the shift register occurs when the logic "1" inserted in $R_0$ at the time of initialization passes into $R_8$. Bit $A_6$ is then stored in $R_7$ and so on to $A_0$ which is stored in $R_1$. Bit W is always equal to zero. Bits $A_2$, $A_1$ and $A_0$ in the sequence will be compared with the corresponding bits in the displayed address by means of three exclusive NOR gates 10, 11 and 12. Gate 10 receives $A_0$ and $Q(R_1)$ at its inputs, gate 11 $A_1$ and $Q(R_2)$, and gate 12 $A_2$ and $Q(R_3)$. If the address $A_0$, $A_1$, $A_2$ transmitted in the address sequence A is identical to the displayed address, each of the gates 10, 11 and 12 produces a logic "1" at its output. On the basis of the embodiment in FIG. 3, it has also been assumed that bit A(6), A(5), A(4) and A(3) form an identification which for the circuit type in question always has the fixed value 1001. Consequently, the complete identification of an address sequence is performed by a multiple AND gate producing at its output an identification signal DVA and receiving at its inputs the outputs $Q(R_7)$ and $Q(R_4)$ and the inverted outputs $P(R_6)$ and $P(R_5)$ and also the outputs from gates 10, 11 and 12. Gates 10, 11, 12 and 15 form the address/sequence identification circuit AIC. On the other hand, the output $Q(R_8)$ produces an end-of-sequence acceptance logic signal ACN. The bit W which follows $A_0$ in the address sequence is by convention a zero; it indicates the "write" mode. It can be identified by also applying $P(R_0)$ to the input of gate 15.

The lower part of FIG. 3, enclosed within a dot-dash line, forms the bus logic BUSL.

It comprises a first D-type control flip-flop DC1 receiving at its input D the signal ACN available at output Q of $R_8$, and at its synchronizing input CK the clock signal SCL, and a second control or pointer flip-flop PNT, also of D-type, whose inverting output P is retrocoupled to its input D, its synchronizing input CK being connected to the output Q of the first flip-flop DC1. The purpose of the pointer PNT is to indicate whether the address sequence or the data sequence of a cycle is in progress.

A third and fourth control flip-flop, STR and STP respectively, also D-type flip-flops, have the task of controlling the start and end of a cycle. The bus indicates the start of a cycle (see FIG. 4b) by a transition from level "1" to level "0" of the signal SDA when the clock signal SCL is at level "1", and the end of a cycle by a transition from level "0" to level "1" of signal SDA when the clock signal SCL is at level "1". On the other hand, the information-carrying transitions of the signal SDA occur when the clock signal SDA is at logic level "0". The fourth flip-flop STP has the task of indicating whether the circuit is in an active or inactive state relative to the bus. In the latter case its output initializes the register R.

The third flip-flop STR receives the clock signal SCL at its input D and is synchronized at input CK by the signal SDA so as to detect the start of a cycle, whereas the fourth flip-flop STP receives the clock signal SCL at its input D and, at its synchronizing input CK, the inverted signal $\overline{SDA}$ derived from SDA by an inverter 28, so as to detect the end of a cycle. The output Q of the third flip-flop STR is applied to the reset-to-zero input R of the pointer flip-flop PNT and of the fourth flip-flop STP. The third flip-flop STR is reset to zero by the inverse clock signal $\overline{SCL}$ obtained by the inverter 60 whose output is connected to the input R of STR. The authorization signal DVA produced at the output of gate 15 is stored by a flip-flop comprising two inverting AND gates 66 and 67 interconnected in the sense that the output from gates 66 and 67 is respectively connected to an input of gates 67 and 66. This storage process is enabled by an inverting AND gate 67 and occurs when DVA=1, SCL=1 and PNT Q (output of the pointer)=0. This last condition indicates that the address part of a cycle is in progress and avoids any accidental identification in a data sequence. The inverting AND gate 65 thus receives at its inputs the signals DVA and SCL and the inverted P output from the pointer flip/flop PNT, and its output is connected to the other input of the inverting AND gate 66. On the other hand, the other input of the inverting AND gate 67 receives a signal STN available at the output of an AND gate 70 whose inputs are connected respectively to the inverting outputs P of the control flip-flops STR and STP. As long as STN=1, the signal DVA, which is transient, remains stored in the form of the signal ADC at the output of gate 66. The return of STN to the state "0" means the erasure of this stored signal. The initialization of flip-flops $R_0$ to $R_8$ is effected by the signal RST1 available at the output of inverting AND gate 63 which receives at one input the inverse P of the output of the fourth flip-flop STP (initialization when STPQ=1) or, preferably, as shown, the output signal STN from the AND gate 70. In the latter case, the initialization occurs when STPQ or STRQ is equal to one, which entails the initialization of the register REG in the event of the arrival of an untimely coincidence corresponding to the start of a cycle while such a cycle is actually in progress. The inverting AND gate 63 receives at its other input a signal RST2 available at the output of an inverting AND gate 44. The latter receives at its three inputs, respectively, the clock signal SCL, the output of the first control flip-flop DC1, and the inverted output P from the pointer PNT.

The flip-flops $R_0$ to $R_8$ are initialized when the flip-flop STP stores an inactive state of the circuit (STPQ=1), or between an address sequence and a data sequence (RST2), and also at the start of a cycle.

A D-type flip-flop $R_9$ generates at its output P an inverted authorization logic signal $\overline{ACK}$, which means that the acceptance corresponds to a logic "0". The flip-flop $R_9$ is synchronized at its loading-control input CK by the clock signal SCL and receives at its input D the output from an AND gate 16, one input of which receives the end-of-sequence acceptance signal ACN and the other the stored identification signal ADC.

The loading of the storage flip-flops $M_0$ to $M_7$ is controlled by an inverted load signal $\overline{LDA}$ applied to their loading-control input CK when $\overline{LDA}$ changes from the state "1" to the state "0". The signal $\overline{LDA}$ is obtained from an inverting AND gate 33 whose inputs receive the end-of-sequence acceptance signal ACN, the stored identification signal ADC, and the outputs Q from the first flip-flop DC1 and from the pointer flip-flop PNT. The loading is thus controlled when an end of a data sequence is detected while, previously, and address sequence corresponding to that displayed by the circuit had been identified.

The fourth flip-flop STP is changed to the state "1" by the output from an inverting AND gate 71 which has four inputs. Its first input receives the inverted output P from STP (self/maintenance of the state "1" by STP) and its second input the inverse $\overline{PON}$ pulse produced when voltage is first applied (STP being placed in the state "1" by the first application of the voltage).

The third input receives the output from inverting AND gate 69 whose inputs are SCL, the output Q from DC1, and the output Q from the pointer PNT (change to the state "1" of STP at the end of the cycle, even in the event of failure of the bus). The fourth input receives the output from an inverting AND gate 68 whose inputs are the output Q from DC1 and the inverse value $\overline{ADC}$ from inverting AND gate 67 (change to the state "1" of STP if, by the end of an address sequence, no identification signal has been produced and stored).

Finally the pulse PON also resets to zero (input R) the first control flip-flop DC1 and flip-flop $R_9$.

DESCRIPTION OF TWO TIMING DIAGRAMS

Figure 4A:
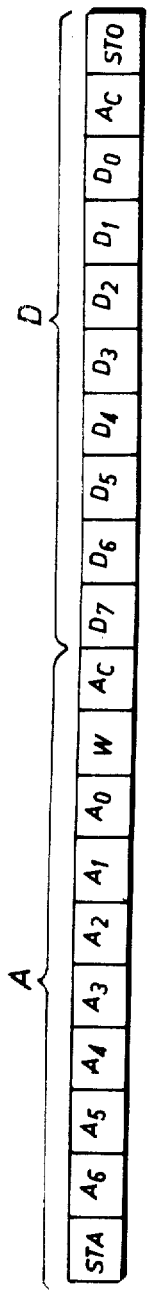
FIGS. 4a and 4b are respectively, a cycle delivered by the bus and a timing diagram of the principal signals in FIG. 3.
Figure 4B:
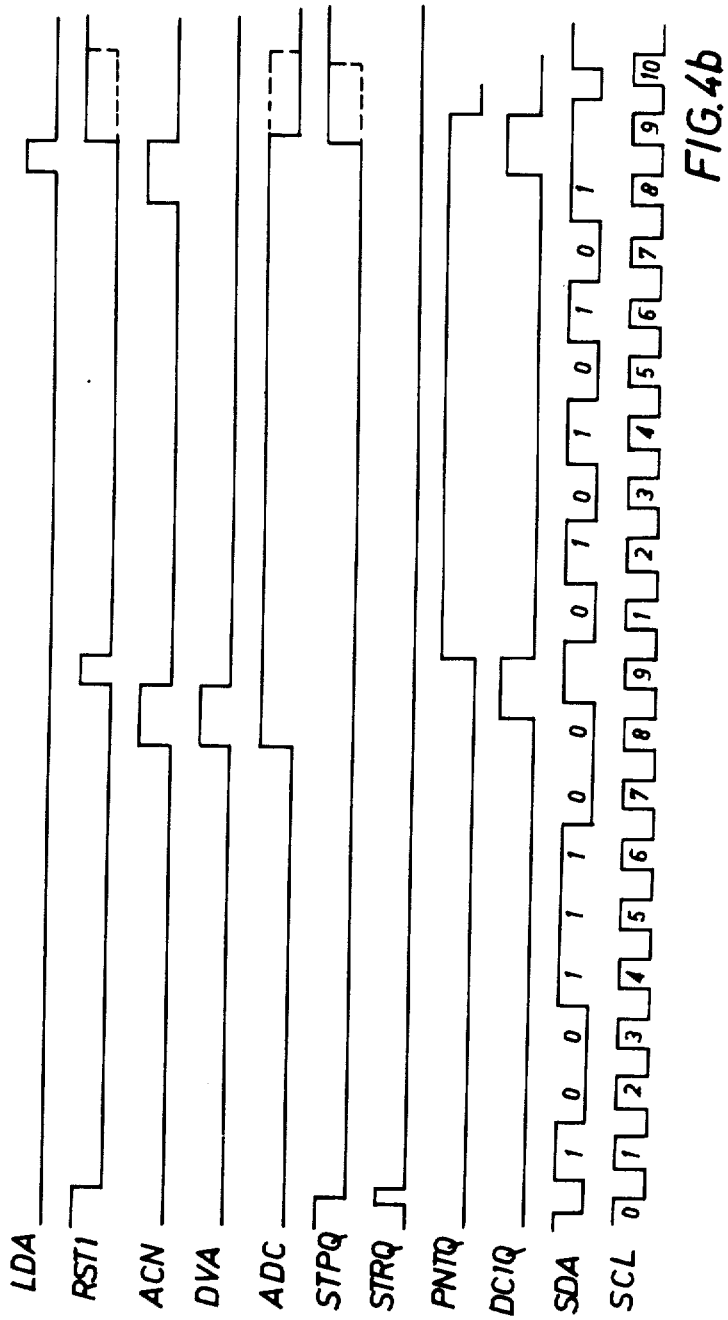

With reference to FIGS. 4a and 4b the operation of the circuit in the event of an information cycle provided by the bus, and corresponding to the displayed address $A_0$, $A_1$, $A_2$ at inputs $S_0$, $S_1$ and $S_2$ of the circuit will now be described.

The starting condition STA corresponds to a negative-going edge of SDA with SCL=1. This is detected by STR whose output STRQ changes to the state "1" upon the negative-going edge of SDA, this change to the state "1" also having the effect of resetting the Q-outputs of STP and of PNT to zero and of making ADC=0 because STN=0 and DVA=0. At the moment the output P of STP changes to the state "1" (STPQ=0) and RST1 also to the state "0". Thanks to the previous initialization, flip-flop $R_0$ is at that moment in the state "1", and the flip-flops $R_1$ to $R_8$ in the state "0". The Q output from STR is changed back to zero by the negative-going edge of the starting clock pulse SCL. The bus transmits the address sequence A until $R_8$ receives via a shift process the logic "1" stored in $R_0$ at the moment of initialization, resulting in ACN=1 on the positive-going edge of the 8th clock pulse. The bit $A_6$ is then located in $R_7$ and so on until $A_0$ is located in $R_1$, and W=0 (by convention) in $R_0$. The address transmitted by the bus corresponding to that displayed by the circuit, the AND gate 15 transmits a DVA=1, which is authorized by gate 65 because the output P from the pointer PNT is in the "1" state as from the 8th clock pulse SCL. ADC changes to the state "1". At the next clock pulse DVA again changes to "0" but ADC remains at the level "1" because the outputs P from STR and STP are both at the level "1", hence STN=1.

The simultaneous presence of ACN and ADC, detected by gate 16, produces at the output P of $R_9$ the signal $\overline{ACK}$ on the negative-going edge of the 8th clock pulse, the latter being erased by the negative-going edge of the 9th clock pulse because the output of gate 16 at that moment is at zero: ACK is therefore a signal identical to ACN but delayed by half a clock pulse. It is therefore present when the clock is at its high level for the ninth pulse, hence in the space provided for that purpose between the address sequence A and the data sequence D. The way in which the bus system deals with this signal ACK is described in the cited U.S. patent application Ser. No. 316,693.

The signal ACN also sets the flip-flop DC1 (DC1Q) to the state "1" upon the negative-going edge of the 8th clock pulse. DC1Q changes back to zero on the negative-going edge of the 9th clock pulse because ACN has changed back to zero on the positive-going edge of this same clock pulse. This negative-going edge of DC1Q causes the output of the pointer PNT to change to the state "1" (PNTQ=1). The pointer PNT thus notes the fact that the data sequence D of the cycle is now about to be received.

For the duration of the 9th clock pulse SCL, SCL=1, DC1Q=1 and PNTQ=0, hence RST1=1, which causes the initialization of register R, $R_0$ being in the state "1" and $R_1$ to $R_8$ in the state "0".

The arrival of the data sequence thus occurs with ADC=1 and PNT=1.

As for the address sequence A, the logic "1" stored in $R_0$ at the time of initialization is transferred by the shifting process to the register $R_8$ so as to produce an ACN=1 on the positive-going edge of the 8th clock pulse in the sequence D, ACN returning to 0 on the positive-going edge of the next clock pulse. Bit $D_7$ is then stored in $R_7$ and so on until the $D_0$ which is stored in $R_0$. We then have DC1Q=1 on the negative-going edge of the 8th clock pulse in the sequence D, DC1Q returning to 0 on the negative-going edge of the next clock pulse.

Between the negative-going edge of the 8th clock pulse of the sequence D and the next positive-going edge, there occurs simultaneously DC1Q=PNTQ=ACN=ADC=1, hence LDA=1 for the duration of half a clock pulse. The contents of $R_0$ to $R_7$ are transferred in parallel into the memory flip-flops $M_0$ to $M_7$. In particular, $M_0$ receives from $R_0$ the bit $D_0$, a "0" in principle making it possible to enable the command OFF at the input of gate 90 (FIG. 3).

The open or closed position of switches $I_1$ to $I_9$ is then altered in accordance with the new contents of memories $M_0$ to $M_7$ if the control OFF is inactive or inhibited by $D_0$.

As for the address sequence A, $R_9$ produces a signal ACK=1 between the negative-going edge of the 8th and that of the 9th clock pulse in the sequence D. The change to zero of DC1Q on the negative-going edge of the 9th clock pulse in the sequence D causes the resetting to zero of the pointer (PNTQ=0). At the end of the cycle the bus transmits an "off" signal formed by a positive-going edge SDA on a clock signal SCL at the level "1", resulting in STPQ=1, hence STN=0, therefore ADC=0, and RST=1 (initialization of register R). An improved form of the interface circuit according to the invention caters for the case in which the bus might fail with regard to the production of such an "off" signal.

To that end, advantage is taken of the fact that, in the terminal phase of a cycle, a transitory and characteristic situation occurs in which DC1Q=PNTQ=1. The gate 69 then switches the flip-flop STP to state "1" (STPQ=1) on the positive-going edge of the 9th clock pulse in the sequence D.

The "off" signal delivered by the bus consists of a positive-going edge on the signal SDA while SCL=1 on the 10th clock pulse in the sequence D. It is detected by the flip-flop STP which changes to the state "1" (STPQ=1), in the circuit variants not incorporating a gate 69. This is represented by dashes in FIG. 4b, and also applies to signals ADC and RST1.

What is claimed is:

1. A slave type interface circuit for attaching to a serial bus having a data signal line (SDA) and a clock signal line (SCL), said circuit comprising:
   a plurality of addressing inputs ($S_0$, $S_1$, $S_2$) for receiving present address bits ($A_0$, $A_1$, $A_2$) for identifying the circuit in question;
   a data input connectable (L1) to said data signal line;
   a clock input (L2) connectable to said clock signal line;
   a shift register ($R_0$ ... $R_7$) connected to said data input and clock input for receiving data sequences and address sequences under synchronization by said clock signal line, said sequence being organized in bit cycles, each bit cycle having at least one sequence;
   a memory (M) fed by parallel outputs of said shift register;
   a first decoder (CDEC) fed by parallel outputs of said memory for generating decoded binary control signals for controlling user circuits (COM);
   wherein said shift register has a downstream end output ($QR_8$) for forwarding an end-of-sequence acceptance signal (ACN) to a data input of a first control flip-flop (DC1) clocked by said clock signal (SCL) and whose output (Q) synchronizes a second control or pointer flip-flop (PNT), whose inverted output (P) is retrocoupled to its input (D), in which the presence of a logic level "1" at the output (Q) of the first flip-flop (DC1) and at the output (P) of the pointer flip-flop enables an initialization of the shift register, which corresponds to the return of a predetermined initial state;
   said circuit furthermore having resetting means for resetting said first and second control flip-flops under the control of an end-of-cycle detection signal (SDA) after said initialization;
   wherein said circuit furthermore comprises: a logic comparator (10, 11, 12) for comparing predetermined address bits present in said shift register ($R_0$ ... $R_7$) and said preset address bits presented by said addressing inputs and upon correspondence producing an identification logic signal (DVA);
   a storage circuit (66, 67) for storing said identification signal, in the form of a stored identification signal (ADC);
   and logical AND gate means enabling the loading into the memory (M) of the data from the shift register when both the outputs of the first control flip-flop ($DC_1$) and the pointer flip-flop (PNT) are in the logic state "1", and when also said stored identification signal (ADC) is present as well an end-of-sequence acceptance signal (ACN), signalling the end of a data sequence following said address sequence.

2. An interface circuit as claimed in claim 1, in which there are provided means to initialize the shift register (REG) by setting a third flip-flop of the shift register ($R_0$) to the state "1", and said resetting means also resets the other flip-flops ($R_1$ ... $R_8$) of the shift register to the state "0" when the output of the first flip-flop ($DC_1$) is in the state "1" and the output (Q) of the pointer flip-flop (PNT) is in the state "0".

3. An interface circuit as claimed in claim 1, comprising a series of logic gates (101 ... 109) for inhibiting the transmission of the logic signals available at the output of the first decoder (CDEC) towards the user circuits under the control of of a logic "off" signal (OFF) provided to the interface circuit.

4. An interface circuit as claimed in claim 3, comprising an auhorisation gate (90) receiving at one input the "off" signal (OFF) and at the other an output (P) from a first flip-flop ($M_0$) of the memory (M) loaded from the first flip-flop ($R_0$) of the shift register (R), so as to selectively enable the "off" signal (OFF).

5. An interface circuit as claimed in any one of the preceding claims, in which is incorporated a pulse generator (PG) which, when the circuit is switched on, generates a pulse (PON) controlling the initialization of the memory (M) and of the shift register (REG).

6. an interface circuit as claimed in claim 5, comprising a third (STR) control flip-flop and a fourth (STP) control flip-flop which, when the interface circuit is in a first state, receive at their input (D) in the clock signal (SCL) and are clocked (CK) one by the information signal (SDA) and the other by the inverse information signal ($\overline{SDA}$), so that output (Q) of the third control flip-flop (STR) is set to the state "1" by a first type of coincidence between the clock (SCL) and information (SDA) signals corresponding to the start of a said cycle, and a fourth control flip-flop (STP) is set to the state "1" by a second type of coincidence between the clock signals (SCL) and information signals (SDA) corresponding to the end of a cycle, the third Control flip-flop (STR) being reset to zero by the inverse ($\overline{SCL}$) of the clock signal (SCL) and the fourth control flip-flop (STP) being reset to zero by the output (Q) from the third (STR) control flip-flop, the output (Q) from the fourth control flip-flop (STP) controlling when in the logic state "1", a setting to the state "1" of the first flip-flop ($R_0$) of the shift register (R) and the resetting to zero of the other flip-flops ($R_1$ ... $R_8$) of the shift register.

7. An interface circuit as claimed in claim 6, in which the fourth control flip-flop (STP) has its output set to the logic state "1" when both the stored identification signal (ADC) is at the logic state "0" and the first control flip-flop ($DC_1$) has its output at "1".

8. An interface circuit as claimed in claim 6, in which the shift register (REG) is initialized when the fourth control flip-flop (STP) has its output at "1".

9. An interface circuit as claimed in claim 8, in which the shift register (REG) is initialized when the third control flip-flop (STR) has its output at "1".

10. An interface circuit as claimed in claim 6, furthermore comprising a pulse generator (PG) for, upon switching-on of the circuit, generating a pulse (PON) for controlling the initialization of the memory (M) and of the shift register (REG) and also for setting the output (Q) of the fourth control flipflop (STP) to the logic state "1", which output is thereupon self-maintained in the state "1".

11. An interface circuit as claimed in claim 5, wherein the fourth control flip-flop (STP) also has its output set to the logic state "1" when both the output from the first ($DC_1$) control flip-flop and the second (PNT control) flip-flop and also the clock signal (SCL) are at the logic level "1".

12. An interface circuit as claimed in claim 11, in which is incorporated an acceptance flip-flop ($R_9$) synchronized by the clock signal (SCL) and receiving at its input the logic product of the acceptance signal (ACN) and the stored identification signal (ADC), and producing at its output an authorization signal (ACK) for transport via the data signal line.

13. An interface circuit as claimed in claim 12, in which is incorporated a pulse generator (PG) which, when the circuit is switched on, generates a pulse (PON) controlling the initialization of the memory (M) and of the shift register (REG) and which also resets to zero the acceptance flip-flop ($R_9$).

14. An interface circuit as claimed in claim 13, in which the said pulse also resets to zero the first control flip-flop ($DC_1$) and sets to the state "1" the fourth control flip-flop (STP).

15. An interface circuit as claimed in claim 14, in which the circuit for storing the identification signal (DVA) comprises two inverting AND gates (66, 67) the output of one of which is retrocoupled to one of the inputs of the other and vice versa, the other input of the first of the two inverting AND gates (66) receiving the inverse ($\overline{DVA}$) of the identification signal (DVA), but only if the pointer (PNT) has its output at the logic state "0" and if the clock signal is in the logic state "1", the other input of the second of the two inverting AND gates (67) receiving the logic product of the inverses (P) of the outputs (Q) of the third (STR) control flip-flop and the fourth (STP) control flip-flops, so as to permit maintenance, during each cycle, of the storage (ADC) of the identification signal (DVA).

* * * * *